US 8,769,142 B2

(12) United States Patent
Konno et al.

(10) Patent No.: US 8,769,142 B2
(45) Date of Patent: Jul. 1, 2014

(54) DATA TRANSFER APPARATUS, INFORMATION PROCESSING APPARATUS AND METHOD OF SETTING DATA TRANSFER RATE

(75) Inventors: Yuuji Konno, Kawasaki (JP); Hiroyuki Wada, Kawasaki (JP); Hiromi Fukumura, Kawasaki (JP); Hiroshi Murakami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 291 days.

(21) Appl. No.: 12/824,458

(22) Filed: Jun. 28, 2010

(65) Prior Publication Data

US 2011/0004740 A1 Jan. 6, 2011

(30) Foreign Application Priority Data

Jul. 1, 2009 (JP) ................. 2009-157287

(51) Int. Cl.
*G06F 15/16* (2006.01)
(52) U.S. Cl.
USPC ........... 709/232; 709/213; 709/226; 370/256; 370/351; 370/463; 711/173
(58) Field of Classification Search
USPC .......... 709/213, 232, 226; 370/256, 351, 463; 707/999; 711/173
See application file for complete search history.

(56) References Cited

U.S. PATENT DOCUMENTS

| | | | | |
|---|---|---|---|---|
| 5,218,680 A | * | 6/1993 | Farrell et al. | 709/215 |
| 5,353,412 A | * | 10/1994 | Douglas et al. | 709/243 |
| 5,361,363 A | * | 11/1994 | Wells et al. | 712/22 |
| 5,388,214 A | * | 2/1995 | Leiserson et al. | 712/15 |
| 5,598,408 A | * | 1/1997 | Nickolls et al. | 370/351 |
| 5,742,499 A | | 4/1998 | Reynolds | |
| 5,842,207 A | * | 11/1998 | Fujiwara et al. | 1/1 |
| 6,223,211 B1 | * | 4/2001 | Hamilton et al. | 709/203 |
| 6,438,586 B1 | * | 8/2002 | Hass et al. | 709/213 |
| 6,510,428 B2 | * | 1/2003 | Tsuchida et al. | 1/1 |
| 7,000,088 B1 | * | 2/2006 | Rudeseal et al. | 711/173 |
| 7,051,123 B1 | * | 5/2006 | Baker et al. | 710/22 |

(Continued)

FOREIGN PATENT DOCUMENTS

| JP | 06-314255 | 11/1994 |
|---|---|---|
| JP | 7-282026 | 10/1995 |

(Continued)

OTHER PUBLICATIONS

Japanese Office Action mailed Apr. 30, 2013 in corresponding Japanese Application No. 2009-157287 (4 pages) (4 pages English Translation)

(Continued)

*Primary Examiner* — Tesfay Yohannes
(74) *Attorney, Agent, or Firm* — Staas & Halsey LLP

(57) ABSTRACT

A method of setting transfer rate for information processing apparatus having a plurality of processing apparatus including a processor outputting data and connected by one or a plurality of data transfer apparatuses for transferring the data outputted from the processor, the method includes obtaining a dividing information indicating a manner of dividing the information processing apparatus into a plurality of partitions including at least one of the plurality of processing apparatuses, and setting a transfer rate of each partition for broadcasting data to all of the processors included in the plurality of processing apparatuses in each partition based on the obtained dividing information.

19 Claims, 11 Drawing Sheets

(56) References Cited

U.S. PATENT DOCUMENTS

| | | | |
|---|---|---|---|
| 7,406,522 B2* | 7/2008 | Riddle | 709/226 |
| 7,415,034 B2* | 8/2008 | Muller et al. | 370/463 |
| 7,551,623 B1* | 6/2009 | Feroz et al. | 370/395.21 |
| 8,191,097 B1* | 5/2012 | Armstrong et al. | 725/91 |
| 2001/0007558 A1* | 7/2001 | Kitazawa | 370/390 |
| 2003/0200373 A1 | 10/2003 | Kent | |
| 2004/0047353 A1* | 3/2004 | Umayabashi et al. | 370/395.63 |
| 2004/0196482 A1* | 10/2004 | Kurita | 358/1.12 |
| 2005/0235110 A1* | 10/2005 | Mylly | 711/115 |
| 2006/0075203 A1* | 4/2006 | Dutta | 711/173 |
| 2007/0067593 A1* | 3/2007 | Satoyama et al. | 711/165 |
| 2007/0130457 A1* | 6/2007 | Kamat et al. | 713/151 |
| 2007/0226177 A1* | 9/2007 | Barsness et al. | 707/2 |
| 2007/0282977 A1* | 12/2007 | Yano et al. | 709/218 |
| 2008/0089248 A1* | 4/2008 | Ushiyama et al. | 370/256 |
| 2008/0320272 A1 | 12/2008 | Fukumura et al. | |
| 2009/0232113 A1* | 9/2009 | Tamaki | 370/337 |
| 2010/0010961 A1* | 1/2010 | Golwalkar et al. | 707/2 |
| 2010/0146180 A1 | 6/2010 | Takahashi et al. | |
| 2010/0161863 A1* | 6/2010 | Cota-Robles et al. | 710/220 |

FOREIGN PATENT DOCUMENTS

| | | |
|---|---|---|
| JP | 2000-259542 | 9/2000 |
| JP | 2000-332751 | 11/2000 |
| JP | 2003-196226 | 11/2003 |
| JP | 2009-69974 | 2/2009 |
| WO | WO 2007/099618 A1 | 9/2007 |
| WO | WO 2008/146338 A1 | 4/2008 |

OTHER PUBLICATIONS

Thilo Kielman et al., "Magpie: MPI's Collective Communication Operations for Clustered Wide Area Systems", Department of Mathematics and Computer Science, Vrije Universiteit, Amsterdam, The Netherlands, May 1999, pp. 131-140.

Cited document 5 in JP OA, pp. 2, 3, of Apr. 30, 2013: Tomosaburo Iwayam, "Project eLiza, IBM heading for information processing in which a complex adaptive system functions," Computopia, Computer Age Co., Ltd., Aug. 1, 2001, vol. 36, No. 419, pp. 11-23.

* cited by examiner

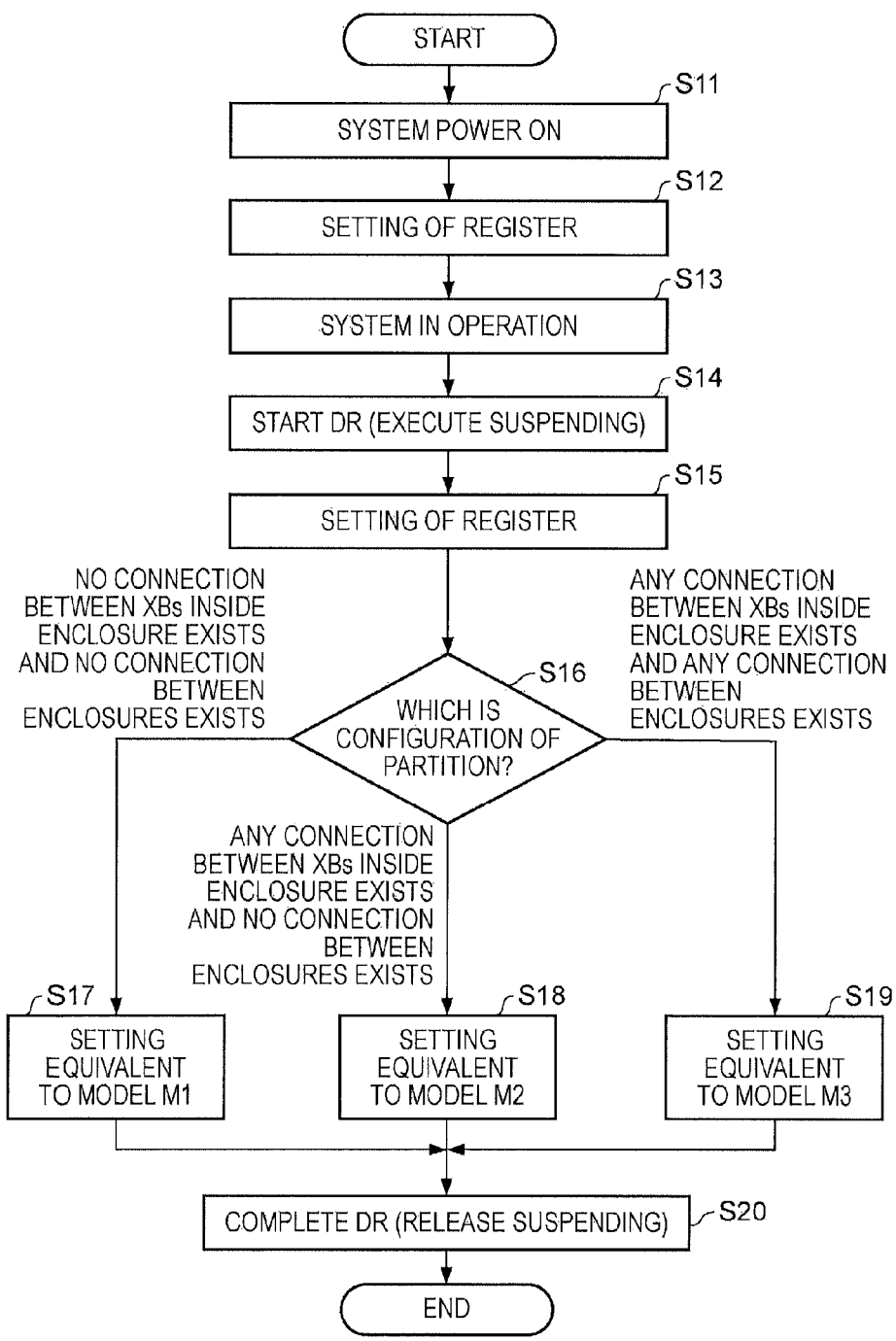

FIG. 9

| CONFIGURATION OF PARTITION | SETTING PERFORMED BY CONFIGURATION CONTROL REGISTER 425 | | LATENCY OF EACH INTERFACE | | | TOTAL LATENCY OF SB→XB(→XB)→SB |
|---|---|---|---|---|---|---|
| | BUFFER 231 | BUFFER 251 | SB-XB INTERFACE | XB0-XB1 INTERFACE | XB0-XB2/3 INTERFACE | |
| EQUIVALENT TO MODEL M1 | BYPASS | UNUSED | CONSTANT (A) | 0 (UNUSED) | 0 (UNUSED) | A(SB→XB)+A(XB→SB) = SMALL (HIGHEST SPEED) |
| EQUIVALENT TO MODEL M2 | VIA BUFFER (AN AMOUNT OF TIME EQUIVALENT TO "B" SHOWN IN RIGHT-HAND COLUMN) | BYPASS | CONSTANT (A) | SMALL (B) | 0 (UNUSED) | A(SB→XB)+B+A(XB→SB) = MIDDLE (HIGH SPEED) |
| EQUIVALENT TO MODEL M3 | VIA BUFFER (AN AMOUNT OF TIME EQUIVALENT TO "D" SHOWN IN RIGHT-HAND COLUMN) | VIA BUFFER (AN AMOUNT OF TIME EQUIVALENT TO "D"-"C" SHOWN IN RIGHT-HAND COLUMNS) | CONSTANT (A) | SOMEWHAT LARGE (C) | LARGE (D) | A(SB→XB)+D+A(XB→SB) = LARGE (LOW SPEED) |

DATA TRANSFER APPARATUS, INFORMATION PROCESSING APPARATUS AND METHOD OF SETTING DATA TRANSFER RATE

CROSS-REFERENCE TO RELATED APPLICATION

This application is based upon and claims the benefit of priority of the prior Japanese Patent Application No. 2009-157287 filed on Jul. 1, 2009, the entire contents of which are incorporated herein by reference.

FIELD

The embodiments discussed herein are related to a data transfer apparatus, information processing apparatus and a method of setting data transfer rate.

BACKGROUND

In multi-processor systems functioning as an information processing apparatus (e.g. server system), in which a plurality of processors functioning as central processing units (CPUs) each have a memory space in common, it may be desirable to maintain cache consistency (i.e., consistency of the content of memory stored in cache memory). That is, the content of memory stored in each area of the memory space may be desirable to be the same at every moment when the area of the memory space is accessed from any of the CPUs. Each of the CPUs caches and stores the content of memory when necessary, and thus, in order to guarantee the cache consistency, data transfer may be desirable to be mutually performed among all the CPUs. Further, prior to commencement of the data transfer, a request for the data transfer, which is performed on a command packet basis, is transmitted to all the CPUs by means of a broadcast transfer. Furthermore, in order to guarantee the order of arrivals of the command packets, which have been broadcast transferred in such a manner as described above, it may be desirable for a packet command to be simultaneously arrive at all of transfer destinations, i.e., all of target nodes. Further, crossbar apparatuses, each functioning as a data transfer apparatus which has a function of relaying data transfers between CPUs, are desired to achieve high efficient data transfer.

FIG. 1 is a block diagram illustrating an example of a configuration of a typical multi-processor system. In this example, this multi-processor system is configured to include a plurality of system boards (SBs) 1-00 to 1-15 (SB 00 to SB 15) and a plurality of crossbar (XB) apparatuses 2-00, 2-10, 2-20 and 2-30 (XB 00, XB 10, XB 20 and XB 30), which relay data transfers between any two system boards out of the plurality of system boards 1-00 to 1-15. Each of the system boards 1-00 to 1-15 is configured to include a CPU, memory chips and a system controller (SC), but, such a configuration itself is well known to those skilled in the art, and thus, is omitted from illustration in FIG. 1.

In this example, the system boards 1-00 to 1-07 and the crossbar apparatuses 2-00 and 2-10 are installed inside the same enclosure 3-0. Further, the system boards 1-08 to 1-15 and the crossbar apparatuses 2-20 and 2-30 are installed inside the same enclosure 3-1. Each of the crossbar apparatuses 2-00 and 2-10 installed inside the enclosure 3-0 is connected to the crossbar apparatuses 2-20 and 2-30 installed inside the enclosure 3-1 via a connection unit 4, such as a cable assembly.

FIG. 2 is a block diagram illustrating an example of a configuration of an existing crossbar apparatus. In FIG. 2, for convenience of explanation, only the configuration of the crossbar apparatus 2-00 is illustrated, but, the configuration of each of the crossbar apparatuses 2-10, 2-20 and 2-30 illustrated in FIG. 1 may be the same as or similar to the configuration of the crossbar apparatus 2-00. The crossbar apparatus 2-00 is configured to include a buffer unit 21, output packet selection units 22 and 27, time difference adjustment units 23 and 25, and a synchronized distribution unit 26, which are mutually connected as illustrated n in FIG. 2.

The buffer unit 21 is configured to include four buffers which are caused to correspond to the system boards 1-00 to 1-03 to which the crossbar apparatus 2-00 is connected, and hold broadcast (BC) commands from the system boards 1-00 to 1-03.

The output packet selection units 22 is configured to transfer a BC command held in the buffer unit 21 to crossbar apparatuses to each of which the BC command may be transferred, on the basis of partition configuration determination information provided by an operation management unit 11, that is, firmware executed by the CPU of the operation management unit 11, from among the crossbar apparatus 2-10 inside the same enclosure 3-0 and the crossbar apparatuses 2-20 and 2-30 inside the different enclosure 3-1. The operation management unit 11, e.g., the firmware executed by the CPU of the operation management unit 11, is configured to determine the configurations of individual partitions on the basis of information relating to apparatuses constituting the server system, and output partition configuration determination information, as well as register setting information in accordance with the partition configuration determination information. In this example, the crossbar apparatus 2-00 is configured to identify pieces of partition configuration information, i.e., partition IDs, which correspond to the sixteen system boards 1-00 to 1-15, respectively. The crossbar apparatus 2-00 is configured to cause the output packet selection unit 22 to hold the pieces of partition configuration determination information corresponding to the partition IDs, which are set by the operation management unit 11, and transfer the BC command to crossbar apparatuses, each being connected to at least a system board having a partition ID equal to one of the partition ID of the system boards 1-00 to 1-03 connected to the crossbar apparatus 2-00 itself. As described below, the crossbar apparatus 2-00 is configured to determine a piece of partition configuration information corresponding to an SB, which is a BC-command transmitter, and transfer the BC command to the crossbar apparatus 2-10 if the piece of partition configuration determination information indicates a partition P2, and transfer the BC command to the crossbar apparatuses 2-10, 2-20 and 2-30 if the piece of partition configuration determination information indicates a partition P3.

The time difference adjustment unit 23 is configured to include a selector 230 and a buffer 231 therein, and BC commands held by the buffer unit 21 and register setting information from the operation management unit 11, e.g., the firmware executed by the CPU of the operation management unit 11, are inputted to the buffer 231 and the selector 230, respectively. The time difference adjustment unit 23 is configured to have four time difference adjustment units which are caused to correspond to the system boards 1-00 to 1-03, respectively. The time difference adjustment unit 23 is configured to receive a BC command from the buffer unit 21. Moreover, in order to cause the BC command to simultaneously arrive at all of target nodes, that is, all of target system boards, the time difference adjustment unit 23 is also configured to output the BC command to the synchronized distribution unit 26 after delaying the broadcast transfer of the BC command by an amount equal to a predetermined delay time by switching the selector 230 in accordance with the register setting information from the operation management unit 11, which will be described below. In the case where no connection between crossbar apparatuses inside a single enclosure exists, the buffer 231 of the time difference adjustment unit 23 is caused to be bypassed by switching the selector 230 in accordance with the register setting information from the operation management unit 11. Further, in the case where the delay time is adjusted so as to be equal to a transfer delay between the crossbar apparatuses 2-00 and 2-10, the delay time is set to it 1τ ("τ" means a period of one cycle), and in the case where the delay time is adjusted so as to be equal to a transfer delay between the crossbar apparatuses 2-00 and 2-20 or between the crossbar apparatuses 2-00 and 2-30, the delay time is set to 2τ. In the case where the buffer 231 of the time difference adjustment unit 23 is configured by using a ring buffer, in the former case, the pointer of the ring buffer is incremented at intervals of 1τ, and in the latter case, the pointer of the ring buffer is incremented at intervals of 2τ.

The buffer unit 21, the output packet selection unit 22 and the time difference adjustment unit 23 constitute a local broadcast control (LBC) unit 28.

A global broadcast control (GBC) unit 29 is configured to output BC commands received from the LBC unit 28 and the crossbar apparatuses 2-10, 2-20 and 2-30 to target system boards. The GBC control unit 29 is constituted by the time difference adjustment unit 25, the synchronized distribution unit 26 and the output packet selection unit 27.

The time difference adjustment unit 25 is configured to include a selector 250 and a buffer 251, and BC commands transferred from the crossbar apparatuses 2-10, 2-20 and 2-30, and register setting information from the operation management unit 11 are inputted to the selector 250. The time difference adjustment unit 25 is configured to output the BC command from the crossbar apparatus 2-10 to the synchronized distribution unit 26 after causing the BC command to be transferred via the buffer 251 by switching the selector 250 in accordance with the register setting information, in order to cause a BC command to simultaneously arrive at all of target system boards. The time difference adjustment unit 25 is further configured to output the BC command from the crossbar apparatus 2-20 or the crossbar apparatus 2-30 to the synchronized distribution unit 26. Moreover, thereby, the time difference adjustment unit 25 is configured to perform adjustment so as to make amounts of transfer time resulting from causing the BC commands to be transferred via paths causing various transfer rates to be equal to one another. Moreover, in the case of a model M1 in FIG. 1, in which no connection between crossbar apparatuses exists, and further, in the case of a model M2 in FIG. 1, in which the crossbar apparatuses 2-20 and 2-30 do not exist, the buffer 251 of the time difference adjustment unit 25 is caused to be bypassed by switching the selector 250 in accordance with the register setting information from the operation management unit 11. In the case of a model 3 in FIG. 1, one or more connections between any two crossbar apparatuses out of the crossbar apparatuses 2-00, 2-10, 2-20 and 2-30 exist.

The synchronized distribution unit 26 is configured to receive a BC command transmitted from the LBC unit 28 included in either of the crossbar apparatuses 2-00, 2-10, 2-20 or 2-30, and distribute the BC command to respective target system boards in synchronization with one another within each partition. The synchronized distribution unit 26 is configured to, include four synchronized distribution units which are caused to correspond to the system boards 1-00 to 1-03, respectively, in order to distribute the BC command to respective system boards 1-00 to 1-03 in synchronization with one another.

The BC commands outputted from the synchronized distribution unit 26 are selected by the output packet selection unit 27, and the outputted BC commands are inputted to the corresponding system boards 1-00 to 1-03. The output packet selection unit 27 is configured to include four output packet selection units which are caused to correspond to the system boards 1-00 to 1-03, respectively.

In addition, commands which are processed by the crossbar apparatuses are not only the BC commands. Peer-to-peer (PP) packets may be also caused to transfer through the same crossbar apparatuses. The output packet selection unit 27 has a function of selecting packets, which are to be outputted therefrom, from among the BC command packets and other kinds of packets, such as a peer-to-peer packet.

As illustrated n FIGS. 1 and 2, the crossbar apparatuses 2-00 and 2-10, and the crossbar apparatuses 2-20 and 2-30 are connected to each other inside the same enclosure, respectively, that is, each of these pairs of crossbar apparatuses is in the condition of a connection inside the same enclosure. In contrast, the crossbar apparatuses 2-00 and 2-20, the crossbar apparatuses 2-00 and 2-30, the crossbar apparatuses 2-10 and 2-20, and the crossbar apparatuses 2-10 and 2-30 are connected to each other via the connection unit 4, respectively. The connection unit 4 is provided between the different enclosures 3-0 and 3-1, that is, each of these pairs of crossbar apparatuses is in the condition of a connection between different enclosures. Therefore, a transfer rate of each of buses used for the connections between different enclosures is lower than the transfer rate of each of buses used for the connections inside the same enclosure. That is, for example, with respect to three interfaces xb1, xb2 and xb3 illustrated in FIG. 3, which are provided by the crossbar apparatus 2-00, the transfer rate of the interface xb1 may be set to a higher transfer rate, but each of the transfer rates of the interfaces xb2 and xb3 may be merely set to a lower transfer rate. Further, a transfer rate which may be realized in the case where one or more connections between crossbar apparatuses inside the same enclosure exist is lower than the transfer rate which may be realized in the case where no connection between crossbar apparatuses inside the same enclosure exists.

As described above, in such a server system as illustrated in FIG. 1, a transmission performance in the case of the configuration of the connections between different enclosures is lower than the transmission performance in the case of the configuration of the connection inside the same enclosure. In this example, a transfer rate of each of buses used for the connections between different enclosures is set to half of the transfer rate of a bus used for the connection inside the same enclosure. Therefore, in order to cause a BC command to simultaneously arrive at all of target nodes, the broadcast transfer rate in the case of the configuration of the connection inside the same enclosure is necessary to be set to a lower transfer rate the same as the transfer rate of the broadcast transfer rate in the case of the configuration of the connections between different enclosures.

However, in the case where a plurality of partitions is set so as to be closed within an enclosure of a server system, although there are connections between different enclosures of the server system, in each of which no data transfer is performed via the connections between different enclosures are likely to exist. For example, in such a partition configuration as illustrated in FIG. 3, among partitions P1, P2 and P3, which are indicated by a chain double-dashed line, a dotted line and a chain single-dashed line, respectively, each of the partitions P1 and P2 is not allowed to transfer BC commands across enclosures. However, in existing methods, regardless of the partition configuration including the partitions P1, P2 and P3, each interface between crossbar apparatuses is set to a lower transfer rate. As described above, compared with transfers performed within a single enclosure, in the case where at least a partition covering a plurality of enclosures is likely to exist, setting of a transfer rate thereof is performed taking into account connections between different enclosures. As a result, the broadcast transfer rate is reduced to half the broadcast transfer rate of the case where the broadcast transfer is performed within the single enclosure of a server system.

In order to perform setting change of the broadcast transfer rate while the server system is being operated, it is necessary to clear packets once, which are being processed in each of apparatuses included in the server system, cause the server system to be in a condition where no process is executed, that is, in a suspend condition, and then, perform setting change of the broadcast transfer rate. Therefore, such processing requires complicated control. For this reason, to date, the transfer rate of broadcast transfers performed across different enclosures has been set to a fixed rate.

[Patent Document 1] Japanese Laid-open Patent Publication No. 2000-259542

[Patent Document 2] Japanese Laid-open Patent Publication No. 06-314255

SUMMARY

According to an aspect of an embodiment, a method of setting transfer rate for information processing apparatus having a plurality of processing apparatus including a processor outputting data and connected by one or a plurality of data transfer apparatuses for transferring the data outputted from the processor, the method includes obtaining a dividing information indicating a manner of dividing the information processing apparatus into a plurality of partitions including at least one of the plurality of processing apparatuses, and setting a transfer rate of each partition for broadcasting data to all of the processors included in the plurality of processing apparatuses in each partition based on the obtained dividing information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is a flowchart illustrating processes of a dynamic setting change according to an embodiment;

FIG. 9 is a diagram illustrating settings of crossbar apparatuses in accordance with each partition configuration, according to an embodiment;

DESCRIPTION OF EMBODIMENTS

In a data transfer apparatus, an information processing apparatus and a method of setting a data transfer rate, which are disclosed here, a broadcast transfer rate is set for each of partitions on the basis of the configuration of the partition. Therefore, for partitions each including therein no connection between enclosures, a higher broadcast transfer rate may be set, compared with a broadcast transfer rate which may be set for partitions each including therein one or more connections between enclosures, and thus, by appropriately partitioning the server system, as a whole, it is possible to realize increase of the broadcast transfer rate.

Hereinafter, embodiments of a method of setting a transfer rate, a data transfer apparatus and an information processing apparatus, according to the present technique, will be described with reference to drawings.

Figure 1:
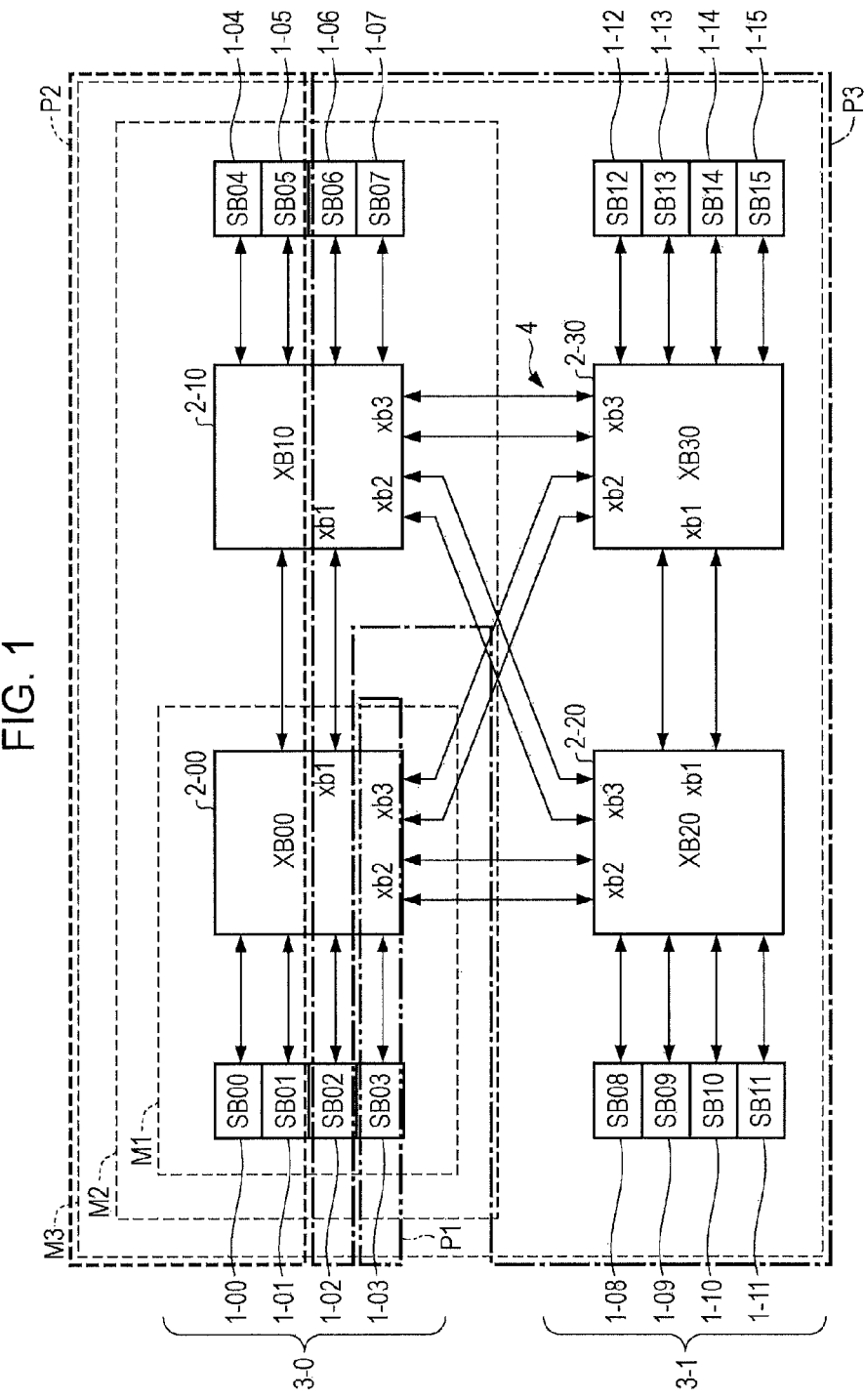
FIG. 1 is a block diagram illustrating an example of a configuration of a typical multi-processor system.
Figure 3:
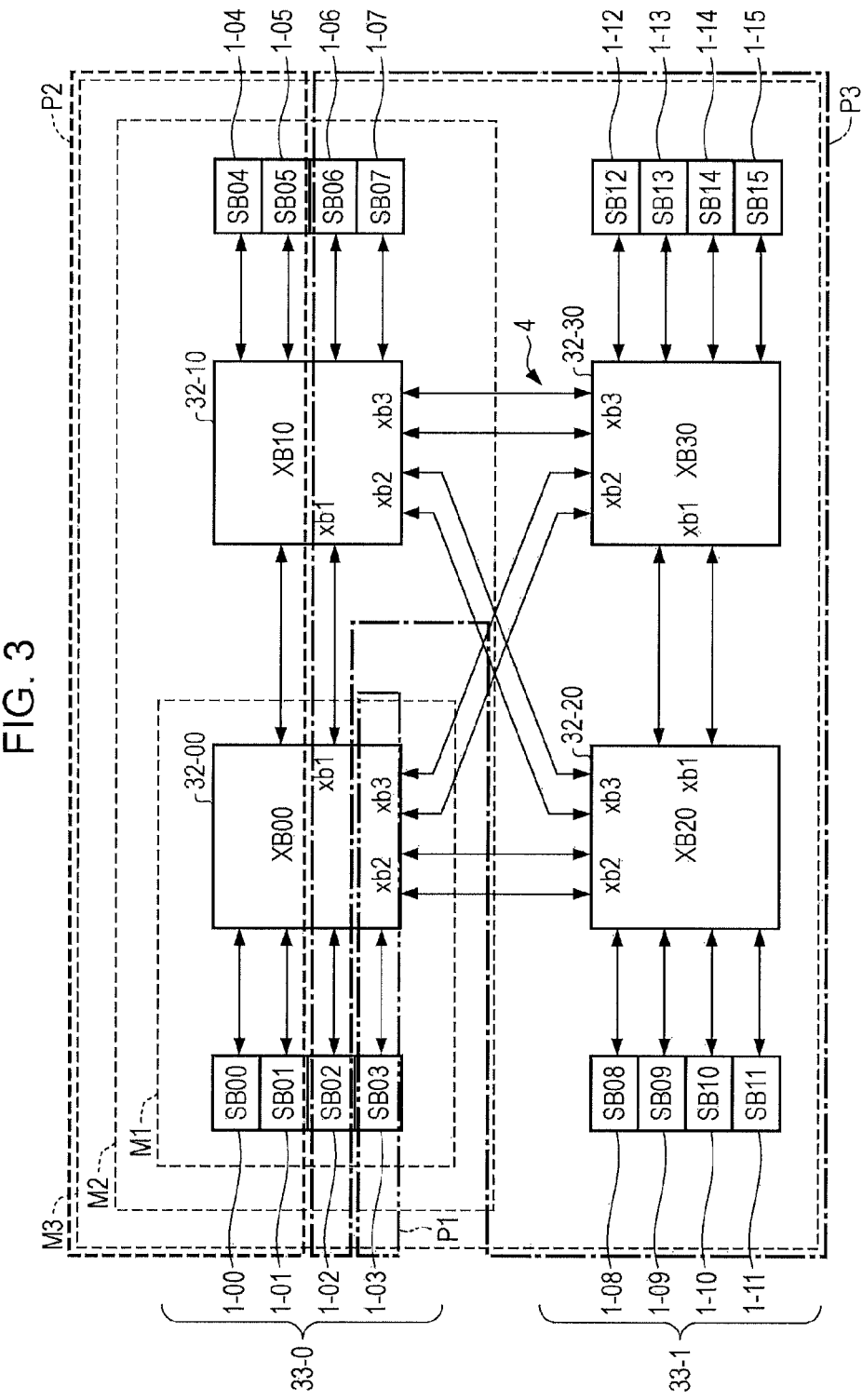
FIG. 3 is a block diagram illustrating an example of a configuration of a multi-processor system according to an embodiment.

FIG. 3 is a block diagram illustrating an example of a configuration of a multi-processor system as an information processing apparatus according to an embodiment. In FIG. 3, the same portions as those illustrated in FIG. 1 are denoted by the same reference numerals as those of the portions illustrated in FIG. 1, and the same portions will be omitted from detailed explanation.

As illustrated in FIG. 3, a server system is realized by a multi-processor system including therein a plurality of system boards (SB) 1-00 to 1-15 (SB 00 to SB 15), and a plurality of crossbar (XB) apparatuses 32-00, 32-10, 32-20 and 32-30 (XB 00, XB 10, XB 20 and XB 30). Each of the system boards 1-00 to 1-15 is an information processing apparatus including therein a CPU, memory chips and system controllers, and is omitted from illustration in FIG. 3 because such a configuration itself is well known to those skilled in the art.

In this embodiment, the system boards 1-00 to 1-07 and the crossbar apparatuses 32-00 and 32-10 are installed inside the same enclosure 33-0. Further, the system boards 1-08 to 1-15 and the crossbar apparatuses 32-20 and 32-30 are installed inside the same enclosure 33-1. Each of the crossbar apparatuses 32-00 and 32-10, which are installed inside the enclosure 33-0, is connected to the crossbar apparatuses 32-20 and 32-30, which are installed inside the enclosure 33-1, via a connection unit 4, such as a cable assembly.

In addition, for convenience of explanation, this embodiment will be described below by way of an example in which two enclosures are included in a server system; however, needless to say, the present enclosure may be applied to server systems each including two or more enclosures.

Figure 2:
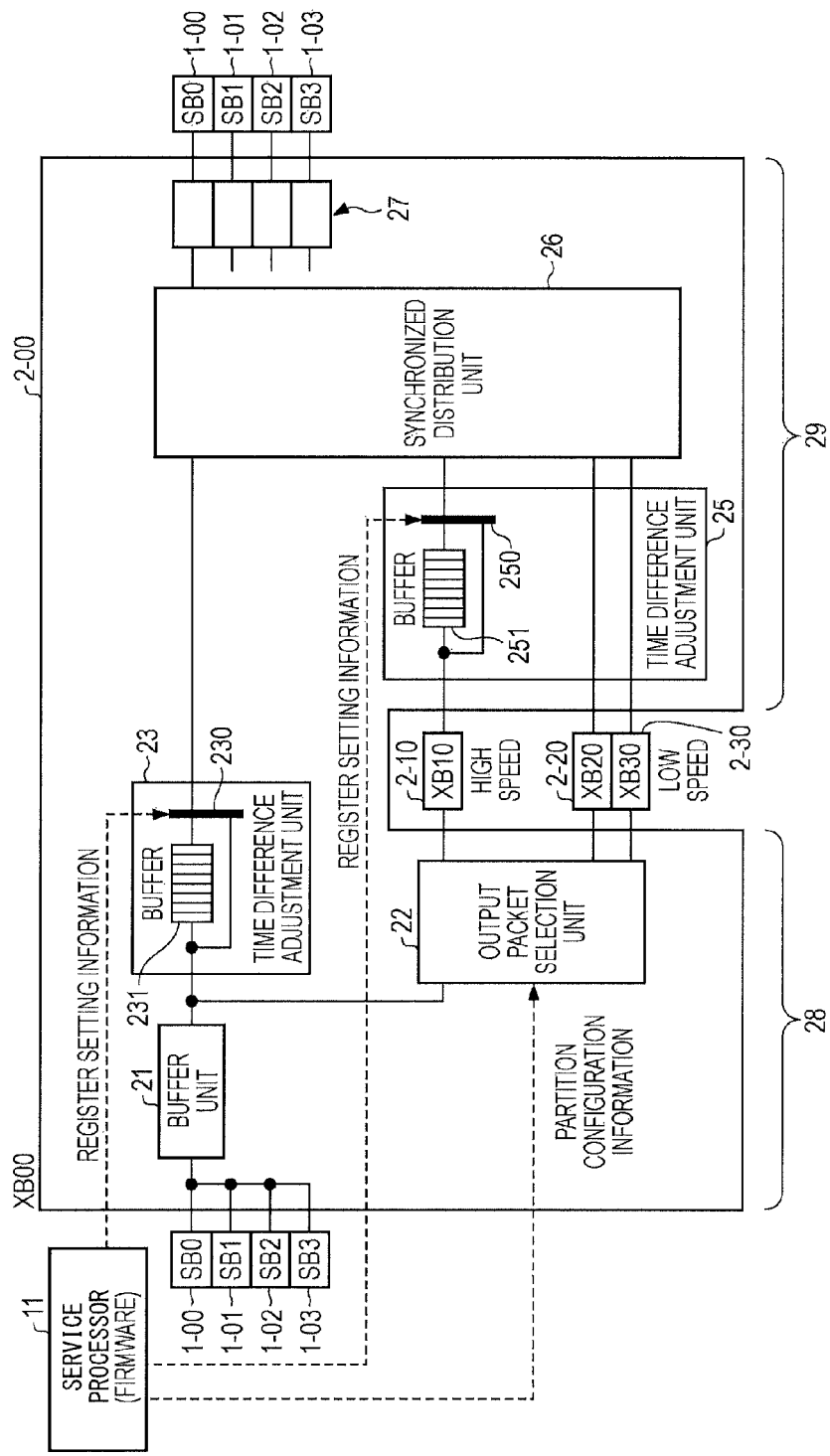
FIG. 2 is a block diagram illustrating an example of a configuration of an existing crossbar apparatus.
Figure 4:
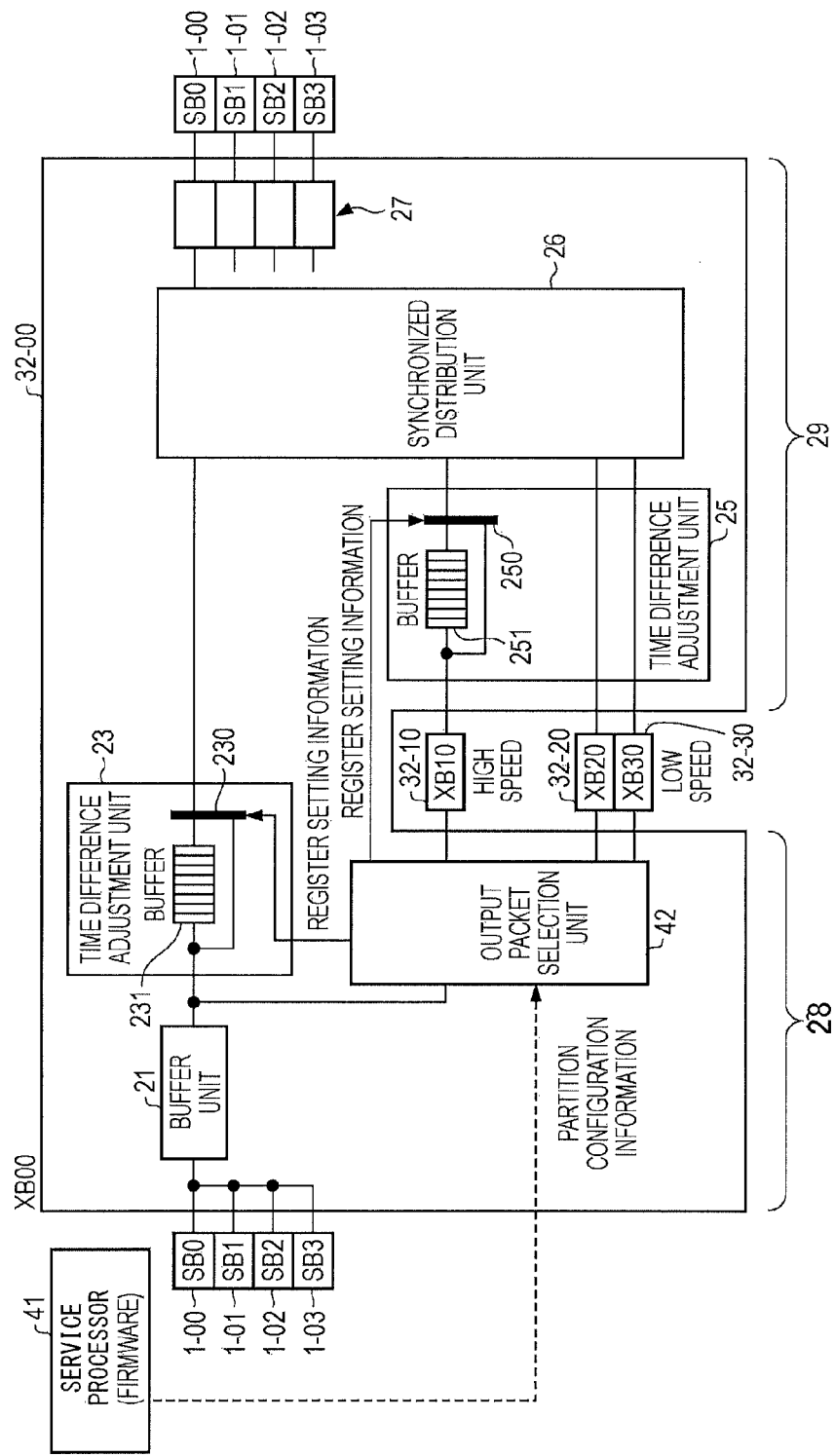
FIG. 4 is a block diagram illustrating an example of a configuration of a crossbar apparatus according to an embodiment.

FIG. 4 is a block diagram illustrating an example of a configuration of a crossbar apparatus. In FIG. 4, the same portions as those illustrated in FIG. 2 are denoted by the same reference numerals as those of the portions illustrated in FIG.

2, and the same portions will be omitted from detailed explanation. In FIG. 4, for convenience of explanation, only the configuration of the crossbar apparatus 32-00 is illustrated, but, obviously, the configuration of each of the crossbar apparatuses 32-10, 32-20 and 32-30 illustrated in FIG. 3 may be the same as or similar to the configuration of the crossbar apparatus 32-00. The crossbar apparatus 32-00 is configured to include therein a buffer unit 21, output packet selection units 42 and 27, time difference adjustment units 23 and 25 and a synchronized distribution unit 26, which are mutually connected as illustrated in FIG. 4.

The buffer unit 21 is provided with four buffer units, which are caused to correspond to the system boards 1-00 to 1-03 connected to the crossbar apparatus 32-00, respectively, and holds broadcast (BC) commands from the system boards 1-00 to 1-03.

The output packet selection units 42 is configured to transfer a BC command transmitted from one of the system boards 1-00 to 1-03 and held in the buffer unit 21 to the crossbar apparatus 32-10 inside the same enclosure 33-0 and/or the crossbar apparatuses 32-20 and 32-30 inside the different enclosure 33-1, to which it is determined that the BC command is to be transferred on the basis of partition configuration information provided by an operation management unit 41, e.g., firmware executed by the CPU of the operation management unit 11. The operation management unit 41 may be configured by employing a processor and the like, which are well known. In this embodiment, the crossbar apparatus 32-00 is configured to cause the output packet selection unit 42 to hold partition IDs as pieces of partition configuration information which are caused to correspond to the sixteen system boards 1-00 to 1-15, respectively. The partition IDs being used to identify each of partitions. The crossbar apparatus 32-00 is configured to transfer the BC command from one of the system boards 1-00 to 1-03 to one or more crossbar apparatuses, each of which is connected to one or more system boards each having a partition ID equal to the partition ID of a transmitter of the BC command, that is, one of the system boards 1-00 to 1-03 connected to the crossbar apparatus 32-00 itself. As described below, the crossbar apparatus 32-00 is configured to transfer a BC command to the crossbar apparatus 32-10 in the case where the BC command is transmitted from one of the system boards 1-00 to 1-03, which has a piece of partition configuration information indicating a partition P2 allocated thereto, and the crossbar apparatus 32-00 is configured to transfer a BC command to the crossbar apparatuses 32-10, 32-20 and 32-30 in the case where the BC command is transmitted from one of the system boards 1-00 to 1-03, which has a piece of partition configuration information, indicating a partition P3 allocated thereto.

Further, the output packet selection unit 42 is configured to create and output register setting information which is created on the basis of partition configuration information from the operation management unit 41, and the output packet selection unit 42 is used for setting registers included in the time difference adjustment units 23 and 25. Operations performed by the output packet selection unit 42 will be described below in detail. The output packet selection unit 42 functions as a setting means configured to perform setting of broadcast transfer rates on the basis of partition configuration information used for identification of configurations of individual partitions.

The time difference adjustment unit 23 is configured to include a selector 230 and a buffer 231 therein, and BC commands held in the buffer unit 21 and register setting information from the output packet selection unit 42 are inputted to the buffer 231 and the selector 230, respectively.

Four time difference adjustment units 23 are provided, and each of the four time difference adjustment units correspond to one of the system boards 1-00 to 1-03, respectively. The time difference adjustment unit 23 is configured to receive a BC command from the buffer unit 21, and in order to cause the BC command to simultaneously arrive at all of target nodes (target system boards). The time difference adjustment unit 23 is configured to output the BC command to the synchronized distribution unit 26, which will be described below, after delaying the broadcast transfer of the BC command by an amount equal to a predetermined delay time caused by switching the selector 230 in accordance with the register setting information from the output packet selection unit 42. In the case of a model M1 in which no connection between crossbar apparatuses exists, the buffer 231 of the time difference adjustment unit 23 is caused to be bypassed by switching the selector 230 in accordance with the register setting information from the output packet selection unit 42. Further, in the case of a model M2, neither a connection between the crossbar apparatuses 32-00 and 32-20 nor a connection between the crossbar apparatuses 32-00 and 32-30 exists, and a connection between the crossbar apparatus 32-00 and 32-10 exists. Further, in the case of a model M3, connections from the crossbar apparatus 32-00 to the crossbar apparatuses 32-10, 32-20 and 32-30 are provided. Further, in the case where the predetermined delay time is caused to be equal to an amount of latency between the crossbar apparatuses 32-00 and 32-10, the delay time is set to $1\tau$, and in the case where the predetermined delay time is caused to be equal to an amount of latency between the crossbar apparatuses 32-00 and 32-10 or between the crossbar apparatuses 32-00 and 32-20, the delay time is set to $2\tau$. In the case where the buffer 231 of the time difference adjustment unit 23 is configured by using a ring buffer, in the former case, the pointer of the ring buffer is incremented at intervals of $1\tau$, and in the latter case, the pointer of the ring buffer is incremented at intervals of $2\tau$.

The buffer unit 21, the output packet selection unit 42 and the time difference adjustment unit 23 constitute a local broadcast control (LBC) unit 48.

A global broadcast control (GBC) unit 29 is configured to output BC commands received from the LBC control unit 48 and the crossbar apparatuses 32-10, 32-20 and 32-30 to target system boards. The GBC control unit 29 is constituted by the time difference adjustment unit 25, the synchronized distribution unit 26 and the output packet selection unit 27.

The time difference adjustment unit 25 is configured to include a buffer 251 and a selector 250. BC commands from the crossbar apparatuses 32-10 to 32-30 and register setting information from the output packet selection unit 42 are inputted to the buffer 251 and the selector 250, respectively. The time difference adjustment unit 25 is configured to, in order to cause a BC command to simultaneously arrive at all of target system boards, output the BC command from the crossbar apparatus 32-10 to the synchronized distribution unit 26 after causing the BC command to be transferred via the buffer 251 by switching the selector 250 in accordance with the register setting information. Further, the time difference adjustment unit 25 is configured to output the BC command from the crossbar apparatus 32-20 or the crossbar apparatus 32-30 to the synchronized distribution unit 26 to perform adjustment so as to make amounts of transfer time resulting from causing the BC commands to be transferred via paths causing various transfer rates to be equal to one another. Further, in the case where no connection between enclosures exists, and one or more connections between crossbar apparatuses exist, the buffer 251 of the time difference adjustment unit 25 is caused to be bypassed by switching the selector 250 in accordance with register setting information from the output packet selection unit 42. The time difference adjustment unit 25 is configured to function as a time difference adjustment means for adjusting amounts of transfer delay time of commands from individual system boards (i.e., nodes) on the basis of register setting information as well as the time difference adjustment unit 23.

The synchronized distribution unit 26 is configured to receive a BC command transmitted from the LBC unit 28 included in either of the crossbar apparatuses 32-00, 32-10, 32-20 or 32-30, and distribute the BC command to respective target system boards in synchronization with one another within each partition. The synchronized distribution unit 26 is configured to include four synchronized distribution units which are caused to correspond to the system boards 1-00 to 1-03, respectively, in order to distribute the BC command to respective system boards 1-00 to 1-03 in synchronization with one another.

BC commands selected by the output packet selection unit 27 are inputted to the corresponding system boards 1-00 to 1-03. The output packet selection unit 27 is configured to include four output packet selection units which are caused to correspond to the system boards 1-00 to 1-03, respectively.

In addition, commands which are processed by the crossbar apparatuses are not only the BC commands. Peer-to-peer (PP) packets may be also caused to transfer through the same crossbar apparatuses. The output packet selection unit 27 has a function of selecting packets, which are to be outputted therefrom, from among the BC command packets and other kinds of packets, such as a peer-to-peer packet.

As illustrated FIGS. 3 and 4, the crossbar apparatuses 32-00 and 32-10, and the crossbar apparatuses 32-20 and 32-30 are connected to each other inside the same enclosure, respectively. That is, each of these pairs of crossbar apparatuses is in the condition of a connection inside the same enclosure. In contrast, the crossbar apparatuses 32-00 and 32-20, the crossbar apparatuses 32-00 and 32-30, the crossbar apparatuses 32-10 and 32-20, and the crossbar apparatuses 32-10 and 32-30 are connected to each other via the connection unit 4, respectively. The connection unit 4 being provided between the different enclosures 33-0 and 33-1, that is, each of these pairs of crossbar apparatuses is in the condition of a connection between different enclosures. Thus, a transfer rate of each of buses used for the connections between different enclosures is lower than the transfer rate of each of buses used for the connections inside the same enclosure. That is, with respect to three interfaces xb1, xb2 and xb3 illustrated in FIG. 3 provided by the crossbar apparatus 32-00, the transfer rate of the interface xb1 may be set to a higher transfer rate, but each of the transfer rates of the interfaces xb2 and xb3 may be merely set to a lower transfer rate, for example. Further, a transfer rate which may be realized in the case where one or more connections between crossbar apparatuses inside the same enclosure exist is lower than that which may be realized in the case where no connection between crossbar apparatuses inside the same enclosure exists.

As described above, in such a server system as illustrated in FIG. 3, a transmission performance in the case of the configuration of the connections between different enclosures is lower than that in the case of the configuration of the connection inside the same enclosure. In this embodiment, a transfer rate of each of buses used for the connections between different enclosures is set to half of the transfer rate of a bus used for the connection inside the same enclosure. Therefore, in order to cause a BC command to simultaneously arrive at all of target nodes, the broadcast transfer rate in the case of the configuration of the connection inside the same enclosure is necessary to be set to a lower transfer rate the same as the transfer rate of the broadcast transfer rate in the case of the configuration of the connections between different enclosures. However, in the case where a plurality of partitions is set so as to be closed within an enclosure, although there are connections between different enclosures of the server system, in each of which no data transfer is performed via the connections between different enclosures are likely to exist. For example, in such a partition configuration as illustrated in FIG. 3, among partitions P1, P2 and P3, which are indicated by a chain double-dashed line, a dotted line and a chain single-dashed line, respectively, each of the partitions P1 and P2 is not allowed to transfer BC commands across enclosures.

Therefore, in this embodiment, by causing the output packet selection unit 42 to output register setting information to each of the time difference adjustment units 23 and 25 on the basis of partition configuration information from the operation management unit 41, a broadcast transfer rate is set for each partition on the basis of a partition configuration thereof. Thus, in the case where no connection between enclosures exists in a certain partition, the above-described method enables a broadcast transfer to be performed within the partition at a higher transfer rate than a transfer rate of a broadcast transfer which is performed within a partition including therein one or more connections between enclosures, and thus, the above-described method leads to an increase of the broadcast transfer rate. As a result, depending on a partition configuration, it is possible to improve a throughput of a broadcast transfer to a greater degree than before. Further, according to this embodiment, in the case of a partition configuration in which no connection between enclosures exists and one or more connections between crossbar apparatuses exist, it is also possible to improve a throughput of a broadcast transfer of a server system to a great extent. Moreover, differing from existing methods, the broadcast transfer rates are not statically set, but are set on the basis of the configurations of individual partitions, and further, may be also changed in conjunction with changing of the partition configuration of the server system in operation.

Figure 5:
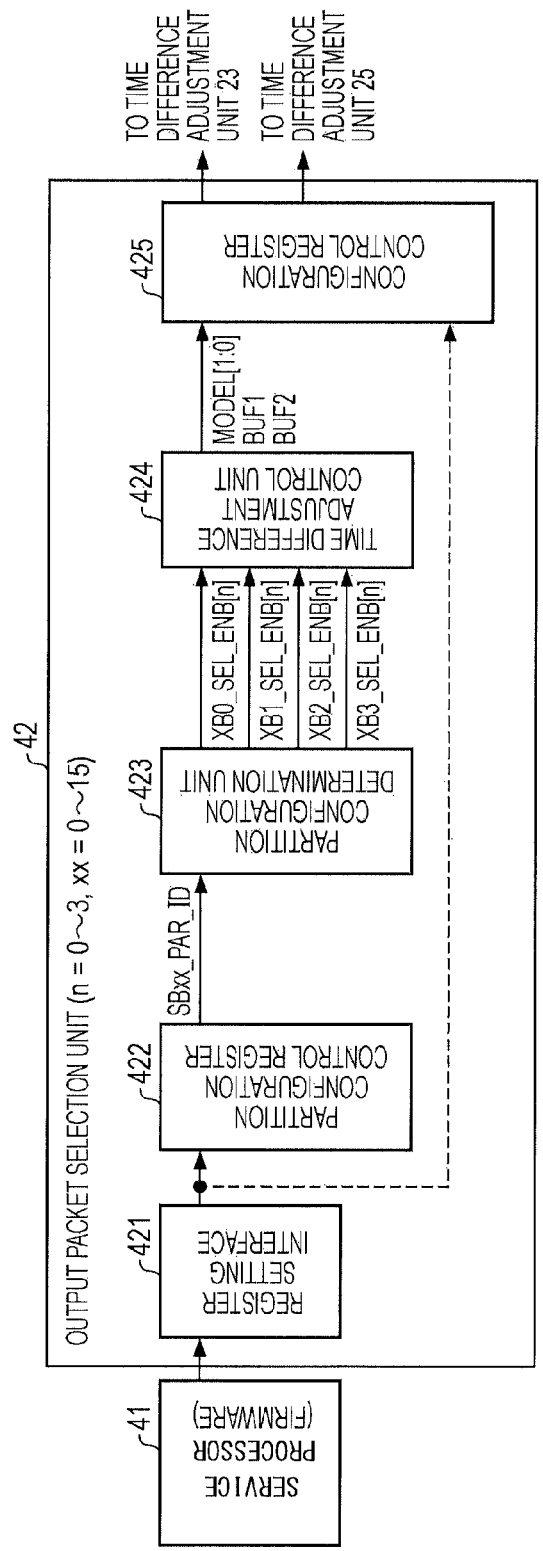
FIG. 5 is a block diagram illustrating an example of a configuration of an output packet selection unit according to an embodiment.

FIG. 5 is a block diagram illustrating an example of a configuration of the output packet selection unit 42. The output packet selection unit 42 is configured to include a register setting interface 421, a partition configuration control register 422, a partition configuration determination unit 423, a time difference adjustment control unit 424 and a configuration control register 425, which are serially connected, as illustrated in FIG. 5. In accordance with a process procedure described below, the output packet selection unit 42 changes the transfer rates of broadcast transfers performed between crossbar apparatuses by notifying the necessity or unnecessity of latency to be performed by the buffers 231 and 251 to the time difference adjustment units 23 and 25, respectively, in accordance with partition configuration information notified from the operation management unit 41.

The partition configuration is determined by the configuration determination unit 423 inside the output packet selection unit 42. The determination of the partition configuration itself may be performed in the same way as or in a way similar to that performed by the operation management unit 11 of an existing crossbar apparatus illustrated in FIG. 2. The partition configuration determination unit 423 recognizes the partition configuration by comparing partition IDs of the sixteen system boards (SBs), and further, the partition configuration determination unit 423 changes broadcast transfer rates for individual partitions in accordance with the recognized partition configuration by means of either a static setting change which is performed under the condition where the server system is powered off before being powered on, or a dynamic setting change which is performed at the timing when a dynamic reconfiguration (DR) is performed immediately after the server system is powered on in this embodiment. The DR is a technology which allows hardware resources, such as processors, memory chips, and input output (IO) devices, to be added or deleted without halting an operating system (OS) installed in the server system. When performing the configuration change by using the DR, crossbar apparatuses causes the server system to operate in a suspend condition.

Figure 6:
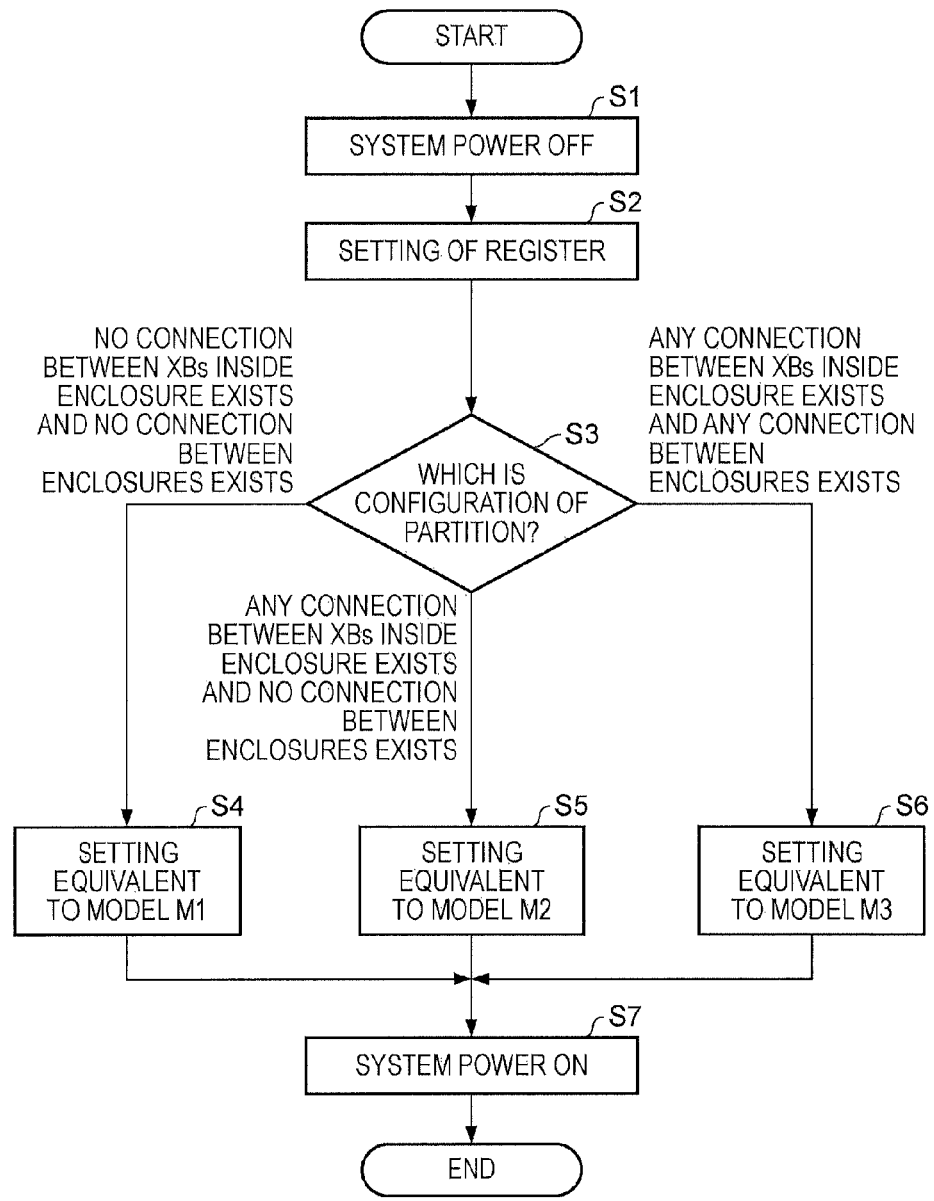
FIG. 6 is a flowchart illustrating processes of a static setting change according to an embodiment.

FIG. 6 is a flowchart illustrating processes of a static setting change. Firstly, in step S1, a crossbar apparatus to which the output packet selection unit 42 belongs (which is the crossbar apparatus 32-00, in this embodiment) is caused to be in a condition where no packet communication via this crossbar apparatus is performed. More specifically, the operation management unit 41 performs setting so as to cause the server system to be in a power-off condition. Subsequently, in step S2, partition configuration information from the operation management unit 41 is set in the partition configuration control register 422 via the register setting interface 421.

Figure 7:
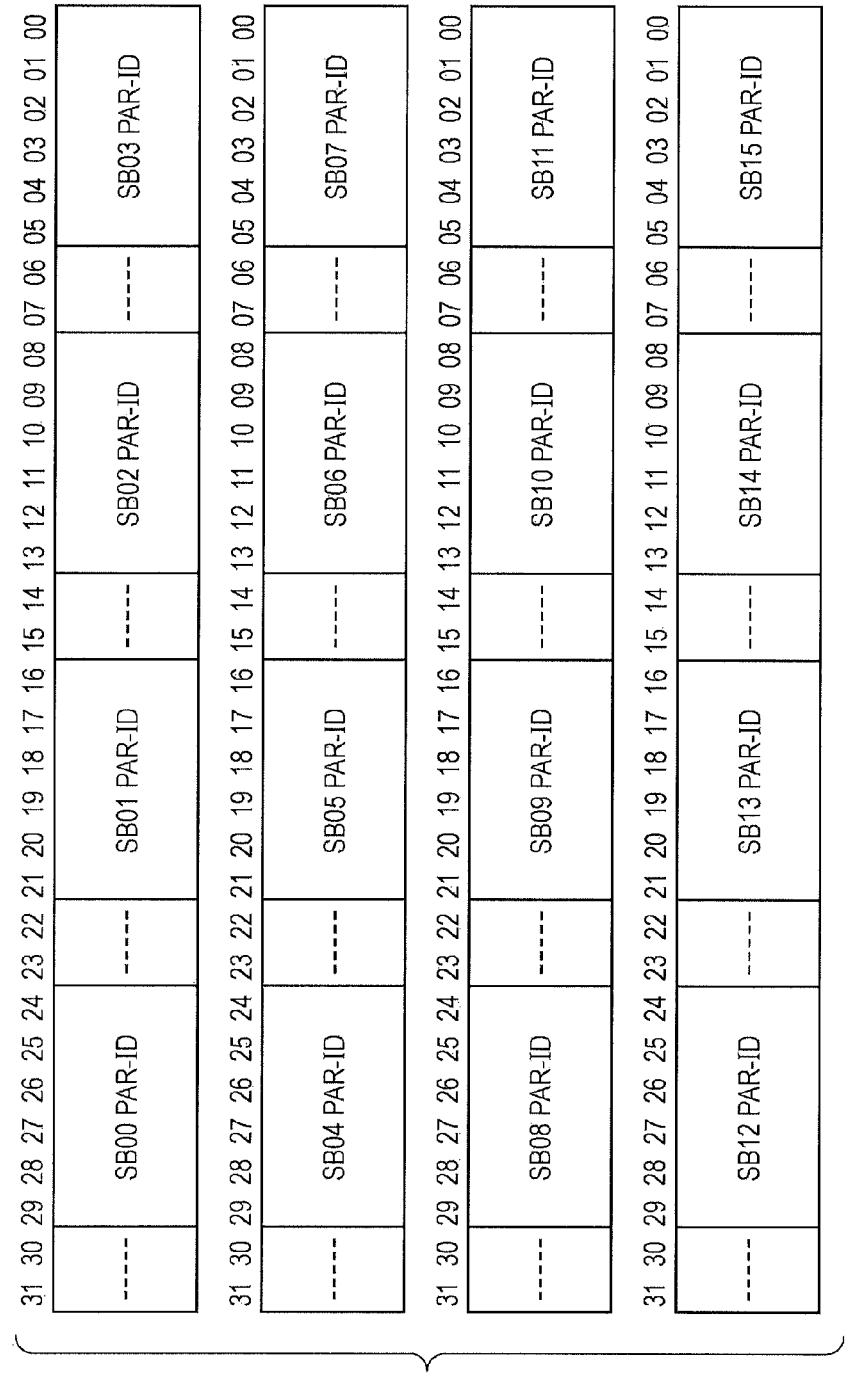
FIG. 7 is a diagram illustrating partition configuration information which is set in a partition configuration control register, according to an embodiment.

FIG. 7 is a diagram illustrating partition configuration information which is set in the partition configuration control register 422. In the partition configuration control register 422 of each of the crossbar apparatuses 32-00, 32-10, 32-20 and 32-30, partition configuration information from the operation management unit 41 is set. In this embodiment, partition IDs (SBxx_PAR_IDs), which correspond to sixteen system boards (SBs), that is, SBxx (XX=00 to 15), respectively, are held in the partition configuration control register 422 as partition configuration information.

In step S3, from the content of setting information held in the partition configuration control register 422, the partition configuration determination unit 423 identifies all partitions, and for each of the identified partitions, determines whether one or more connections between crossbar apparatuses inside the same enclosure exist, or not, and whether one or more connections between different enclosures exist, or not. As a result of the determination having been made in step S3, in the case where no connection between crossbar apparatuses inside the same enclosure exists, and no connection between different apparatuses exists, the process procedure proceeds to step S4. Further, in the case where one or more connections between crossbar apparatuses inside the same enclosure exist, and no connection between different apparatuses exists at step S4, the process procedure proceeds to step S5, and in the case where one or more connections between crossbar apparatuses inside the same enclosure exist, and one or more connections between different apparatuses exist, the process procedure proceeds to step S6. In each of steps S4, S5 and S6, the partition configuration determination unit 423 notifies the time difference adjustment control unit 424 of the determination result.

Upon receipt of the notification from the partition configuration determination unit 423, the time difference adjustment control unit 424 sets the current partition configuration and information relating to usages of the buffer 231 and the buffer 251 in the configuration control register 425. In this embodiment, in the case where a selection indication XBy_SEL_ENB (y=2 or 3) from the partition configuration determination unit 423 is valid in step S6, the time difference adjustment control unit 424 outputs the following setting: MODEL [1:0]="1x", BUF1=1, BUF2=1, which is equivalent to the setting of the model M3. Otherwise, in the case where a selection indication XB1_SEL_ENB is valid in step S5, the time difference adjustment control unit 424 outputs the following setting: MODEL[1:0]="01", BUF1=1, BUF2=0, which is equivalent to the setting of the model M2. In the case where neither of the former condition nor the latter condition is satisfied, and further, in the case where a selection indication XB0_SEL_ENB is valid in step S4, the time difference adjustment control unit 424 outputs the following setting: MODEL[1:0]="00", BUF1=0, BUF2=0, which is equivalent to the setting of the model M1. Here, BUF1 designates a setting for the buffer 231 included in the time difference adjustment unit 23, and, for example, BUF1=0 designates a setting which directs the time difference adjustment unit 23 to cause BC commands to bypass the buffer 231, and BUF1=1 designates a setting which directs the time difference adjustment unit 23 to cause BC commands to be transferred via the buffer 231. Further, BUF2 designates a setting for the buffer 251 of the time difference adjustment unit 25, and, for example, BUF2=0 designates a setting which directs the time difference adjustment unit 25 to cause BC commands to bypass the buffer 251, and BUF1=1 designates a setting which directs the time difference adjustment unit 25 to cause BC commands to be transferred via the buffer 251.

By using these pieces of setting information, the configuration control register 425 directs the selector 230 of the time difference adjustment unit 23 and the selector 250 of the time difference adjustment unit 25 to select a latency circuit, such as the buffer 231 and the buffer 251, respectively, each of which is, for example, a ring buffer and the like, and thereby, the configuration control register 425 changes the transfer rates of broadcast transfers performed across the crossbar apparatuses. With respect to a certain partition, for which it is determined that, actually, no connection between crossbar apparatuses inside the same enclosure exists, and further, no connection between different enclosures exists, a setting equivalent to the setting of the model 1 is performed even though the configuration of the partition is set to the model 2 or the model 3. Further with respect a certain partition, for which it is determined that one or more connections between crossbar apparatuses inside the same enclosure exist and further, no connection between different enclosures exists, a setting equivalent to the setting of the model 2 is performed. Moreover with respect to a certain partition, for which it is determined that one or more connections between crossbar apparatuses inside the same enclosure exist, and further one or more connections between different enclosures exist, a setting equivalent to the setting of the model 3 is performed.

In step S7, the server system is set to a power-on condition, and then, the processes of the static setting change are terminated.

In addition, as illustrated by a dotted line in FIG. 5, the setting of the configuration control register 425 from the operation management unit 41 may be performed, not via the time difference adjustment control unit 424, but via the register setting interface 421.

In control of the server system, in the case where the system-board sides require the partition configuration information, the operation management unit 41 may perform setting system controllers included in the individual system boards. Further, in the case where a plurality of selection indications XBx_SEL_ENBs which are inputted to the time difference adjustment control unit 424 are outputted, a setting equivalent to the setting of the largest scaled partition among the partitions indicated by the selection indications may be performed.

For example, in the case illustrated in FIG. 3 where in such a configuration as connections between different enclosures, the crossbar apparatuses 32-00 and 32-10 are set as a first partition, and the crossbar apparatuses 32-20 and 32-30 are set as a second partition, communications between different enclosures (i.e., communications between the crossbar apparatus XB 00 and the crossbar apparatus XB 20 and between the crossbar apparatus XB 00 and the crossbar apparatus XB 30, and communications between the crossbar apparatus XB 10 and the crossbar apparatus XB 20 and between the crossbar apparatus XB 10 and the crossbar apparatus XB 30) are not performed. In such a manner as described above when it is determined by the partition configuration determination unit 423 that no connection between different enclosures exists, the broadcast transfer rate may be set to a higher transfer rate in this embodiment.

The crossbar apparatus 32-00 illustrated in FIG. 4 transfers BC commands to interfaces of crossbar apparatuses to each of which at least a system board (SB) having the same partition ID as the partition ID of one of the system boards (SB 00 to SB 03) which are connected to the crossbar apparatus 32-00 is connected. In FIG. 5, in the case where either of selection indications XB2_SEL_ENB[i] (i=0, 1, 2 and 3) or either of selection indications XB3_SEL_ENB[i] (i=0, 1, 2 and 3) is valid for a certain partition, it is determined that the partition is configured to cover the two enclosures, and thus, the transfer rate of broadcast transfers performed via connections between any two crossbar apparatuses out of all the crossbar apparatuses belonging to the partition is set to a lower transfer rate.

FIG. 8 is a flowchart illustrating processes of a dynamic setting change. Firstly in step S11, the server system is set to a power-on condition. Next in step S12, partition configuration information from the operation management unit 41 is set in the partition configuration control register 422 via the register setting interface 421. In step S13, the server system executes processes in operation, and in step S14, along with the commencement of the dynamic reconfiguration (DR), the crossbar apparatus 32-00 causes the server system to be in a suspend condition. That is, a suspend command in response to a BC command is transmitted from the crossbar apparatus 32-00 to system controllers of all the system boards, and upon completion of processes in execution, each of the system controllers is in a suspend-release waiting condition.

Next, along with operations for addition and deletion of system boards, and the like, the partition configuration is changed, and in step S15, the changed partition configuration from the operation management unit 41 is set in the partition configuration control register 422 included in the output packet selection unit 42. In addition, it is also possible to implement functions so that partition configuration information is transmitted to all the system controllers in advance before causing each of the system controllers to be in a suspend condition, and the transmitted partition configuration information causes only updating inside each of the crossbar apparatuses to be performed during a period of time while the suspend condition is being continued. After completion of changing the partition configuration, and before resumption of operations performed by the server system, in step S16, from the content of setting information held in the partition configuration control register 422, the partition configuration determination unit 423 identifies all partitions, and for each of the identified partitions, the partition configuration determination unit 423 determines whether one or more connections between crossbar apparatuses inside the same enclosure exist or not, and whether one or more connections between different enclosures exist or not. As a result of the determination having been made in step S16, in the case where no connection between crossbar apparatuses inside the same enclosure exists, and no connection between different apparatuses exists, the process procedure proceeds to step S17, in the case where one or more connections between crossbar apparatuses inside the same enclosure exist, and no connection between different apparatuses exists, the process procedure proceeds to step S18. Moreover, at step S18, in the case where one or more connections between crossbar apparatuses inside the same enclosure exist and one or more connections between different apparatuses exist, the process procedure proceeds to step S19. In each of steps S17, S18 and S19, the partition configuration determination unit 423 notifies the time difference adjustment control unit 424 of the determination result. Processes performed in steps S17, S18 and S19 are the same as or similar to those performed in steps S4, S5 and S6.

By using these pieces of information, the configuration control register 425 directs the selector 230 of the time difference adjustment unit 23 and the selector 250 of the time difference adjustment unit 25 to select a latency circuit, such as the buffer 231 and the buffer 251, respectively, each of which is, for example, a ring buffer and the like. Moreover, thereby, the partition configuration determination unit 423 changes the transfer rates of broadcast transfers performed across the crossbar apparatuses. With respect to a certain partition, for which it is determined that, actually, no connection between crossbar apparatuses inside the same enclosure exists, and further, no connection between different enclosures exists, a setting equivalent to the setting of the model 1 is performed, even though the configuration of the partition is set to the model 2 or the model 3. Further, with respect a certain partition, for which it is determined that one or more connections between crossbar apparatuses inside the same enclosure exist, and further, no connection between different enclosures exists, a setting equivalent to the setting of the model 2 is performed. Moreover, with respect to a certain partition, for which it is determined that one or more connections between crossbar apparatuses inside the same enclosure exist, and further, one or more connections between different enclosures exist, a setting equivalent to the setting of the model 3 is performed.

In step S20, the suspend condition of the server system is released along with completion of the DR, and then, the processes of the dynamic setting change are terminated.

FIG. 9 is a diagram illustrating settings of crossbar apparatuses in accordance with each configuration of partitions according to this embodiment. In this embodiment, the partition configuration determination unit 423 performs settings from a result of determination with respect to the configuration of a partition which is equivalent to the configuration of the largest scaled model M3 as described below. In FIG. 9, "XB 2/3" designates XB 2 or XB 3.

In the case of a partition configuration equivalent to the configuration of the model M1, since it is determined that a target partition is configured to be closed within a crossbar apparatus, in order to improve an amount of latency, settings are performed so that the BC commands are transferred by bypassing the buffer 231 of the time difference adjustment unit 23. As a result, the total amount of latency of SB→XB (→XB)→SB is equal to an amount of latency resulting from setting the broadcast transfer rate to the highest rate.

In the case of a partition configuration equivalent to the configuration of the model M2, since it is determined that a target partition is configured to cover the crossbar apparatuses 32-00 and 32-10 within the same enclosure 33-0, in order to perform adjustment for delaying the broadcast transfer by an amount equivalent to a transfer delay time between the crossbar apparatuses 32-00 and 32-10, settings are performed so that the BC commands are transferred via the buffer 231 of the time difference adjustment unit 23, and further, the BC commands are transferred by bypassing the buffer 251 of the time difference adjustment unit 25. As a result, the total amount of latency of SB→XB (→XB)→SB is equal to an amount of latency resulting from setting the broadcast transfer rate to a higher transfer rate.

In the case of a partition configuration equivalent to the configuration of model M3, since it is determined that a target partition is configured to cover the enclosures 33-0 and 33-1, settings are performed so that the BC commands are transferred via the buffer 231 of the time difference adjustment unit 23 in order to perform adjustment for delaying the broadcast transfer by an amount equivalent to a transfer delay time between the crossbar apparatuses 32-00 and 32-20 or between the crossbar apparatuses 32-00 and 32-30, and further, settings are performed so that the BC commands are transferred via the buffer 251 of the time difference adjustment unit 25 in order to perform adjustment for delaying the broadcast transfer by an amount equivalent to an amount of time resulting from subtracting a transfer delay time between the crossbar apparatuses 32-00 and 32-10 from a transfer delay time between the crossbar apparatuses 32-00 and 32-20 or between the crossbar apparatuses 32-00 and 32-30. As a result, the total amount of latency of SB→XB (→XB)→SB is equal to an amount of latency resulting from setting the broadcast transfer rate to a lower transfer rate.

As described above, according to this embodiment, it is possible to perform settings equivalent to those of a minimum scaled model which enables realization of a target partition from partition configuration information stored in the partition configuration determination unit 423 inside the output packet selection unit 42. In a server system configured to include one or more connections between different enclosures, which degrade transmission capability, partitions, which are configured not to include any connections between crossbar apparatuses, enable realization of broadcast transfers without decreasing the transfer rate thereof.

In addition, since the buffer 231 of the time difference adjustment unit 23 includes four buffers, which are caused to correspond to receiving side system boards, respectively, by performing setting of the four buffers of the buffer 231 independently, any partition which is configured not to include connections between crossbar apparatuses is constantly allowed to perform broadcast transfers with a minimum latency.

Figure 10:
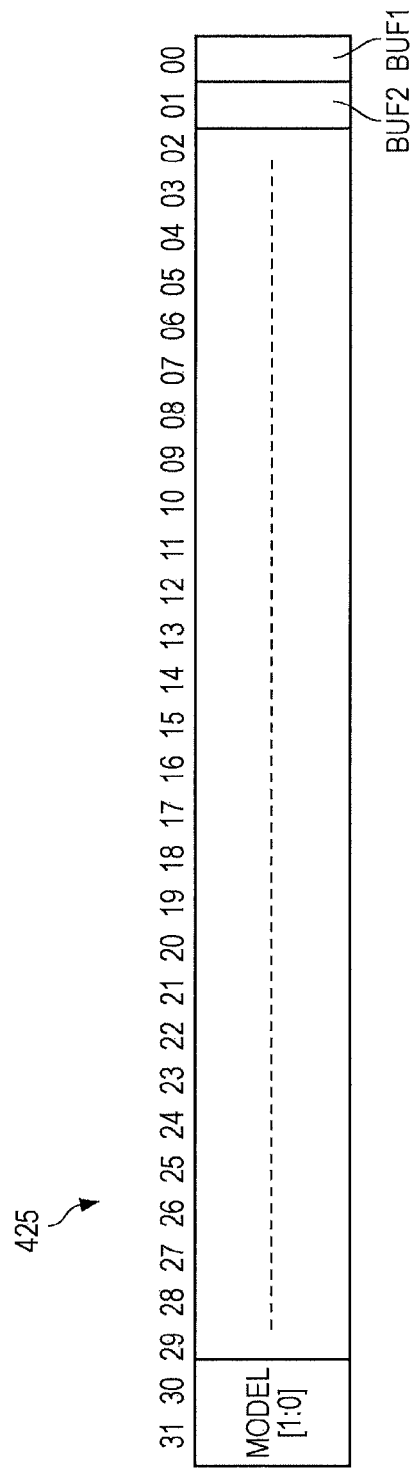
FIG. 10 is a diagram illustrating a content of settings in a configuration control register according to an embodiment.

FIG. 10 is a diagram illustrating a content of settings of the configuration control register 425 included in the output packet selection unit 42. In the configuration control register 425, a partition configuration MODEL [1:0] and buffer settings BUF1 and BUF2 are set. For example, an example of settings equivalent to those of the model M1 is "hX0000000", an example of settings equivalent to those of the model M2 is "hX0000001", and an example of settings equivalent to those of the model M3 is "hX0000002".

Figure 11:
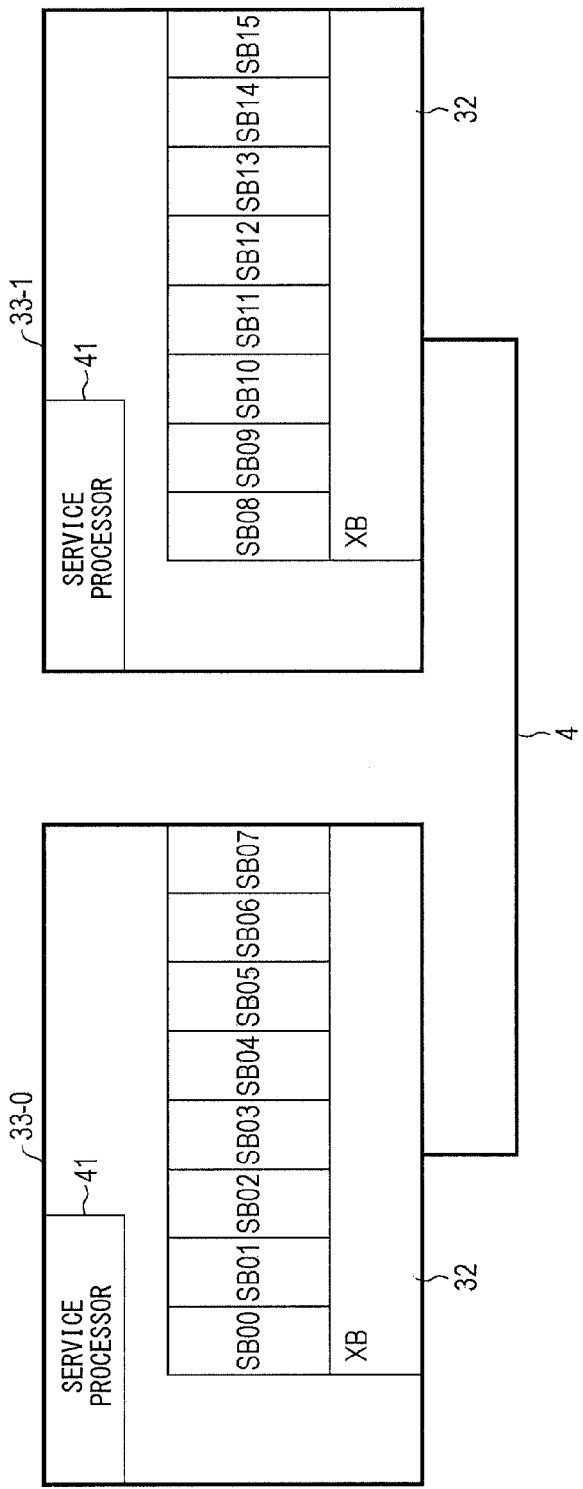
FIG. 11 is a block diagram illustrating a structure of enclosures according to another embodiment.

FIG. 11 is a block diagram illustrating a structure of enclosures according to another embodiment. In FIG. 11, the same portions as those illustrated in FIG. 3 are denoted by the same reference numerals as those of the portions illustrated in FIG. 3, and are omitted from detailed explanation.

In FIG. 11, the operation management unit 41 is provided inside the enclosure 33-0, one or more crossbar apparatuses 32 inside the enclosure 33-0 are connected to one or more crossbar apparatuses 32 inside the enclosure 33-1 via the connection unit 4 such as a cable assembly. The operation management unit 41 is also provided inside the enclosure 33-1. For example, the enclosure 33-0 may be a basic enclosure, and the enclosure 33-1 may be an expanded enclosure.

In addition, the operation management units 41 may be obviously provided outside the enclosures 33-0 and 33-1, respectively.

All examples and conditional language recited herein are intended for pedagogical purposes to aid the reader in understanding the embodiment and the concepts contributed by the inventor to furthering the art, and are to be construed as being without limitation to such specifically recited examples and conditions, nor does the organization of such examples in the specification relate to a illustrating of the superiority and inferiority of the embodiment. Although the embodiments of the present invention have been described in detail, it should be understood that the various changes, substitutions, and alterations could be made hereto without departing from the spirit and scope of the invention.

What is claimed is:

1. A method of setting transfer rate for an apparatus having a plurality of processing apparatuses in a plurality of enclosures, each processing apparatus including a processor outputting data and connected by one or a plurality of data transfer apparatuses for transferring the data output from the processor of the processing apparatus, the method comprising:

determining one of first, second, and third configurations of partitions through which the apparatus is operated as a combination of the plurality of processing apparatuses, the first configuration being a configuration of partitions in which there exists neither connections between data transfer apparatuses inside same enclosure nor connections between different processing apparatuses, the second configuration being a configuration of partitions in which there exists one or more connections between data transfer apparatuses inside same enclosure and there exist no connections between different processing apparatuses, the third configuration being a configuration of partitions in which there exists one or more connections between data transfer apparatuses inside same enclosure and there exist one or more connections between different processing apparatuses;

setting a transfer rate for broadcasting data in a data transfer apparatus included in a partition:
at a first rate when the first configuration is determined as a configuration of the partition for data transfer apparatus;
at a second rate slower than the first rate when the second configuration is determined as a configuration of the partition for data transfer apparatus, and
at a third rate slower than the second rate when the third configuration is determined as a configuration of the partition for data transfer apparatus.

2. The method according to claim 1, wherein the determining one of the configuration of the partitions and the setting the transfer rate for broadcasting data are performed based on partition configuration information received from a firmware, the partition configuration information identifying a configuration of the partitions.

3. The method according to claim 1, wherein the setting the transfer rate for broadcasting data is performed when the one or plurality of processing apparatuses included in a partition are in a power-off condition.

4. The method according to claim 1, wherein the setting the transfer rate for broadcasting data is performed when a hardware resource is added to or deleted from the apparatus.

5. The method according to claim 4, wherein the setting the transfer rate for broadcasting data is performed when the apparatus has a suspend condition.

6. A data transfer apparatus for transferring data output from a processor included in each of a plurality of processing apparatuses connected to the data transfer apparatus, the data transfer apparatus comprising:

a determination unit configured to determine one of first, second, and third configurations of partitions through which a combination of the plurality of processing apparatuses are operated, the first configuration being a configuration of partitions in which there exists neither connections between the data transfer apparatus and another data transfer apparatus inside same enclosure nor connections between different processing apparatuses, the second configuration being a configuration of partitions in which there exists one or more connections between the data transfer apparatus and another data transfer apparatus inside same enclosure and there exists no connections between different processing apparatuses, the third configuration being a configuration of partitions in which there exists one or more connections between the data transfer apparatus and another data transfer apparatus inside same enclosure and there exists one or more connections between different processing apparatuses; and a setting unit configured to set a transfer rate for broadcasting data in the data transfer apparatus included in a partition, based on the determined one of the first, second, and third configurations of the partitions, according to:
- a first rate when the first configuration is determined as a configuration of the partition for the data transfer apparatus,
- a second rate slower than the first rate when the second configuration is determined as a configuration of the partition for the data transfer apparatus, and
- a third rate slower than the second rate when the third configuration is determined as a configuration of the partition for the data transfer apparatus.

7. The data transfer apparatus according to claim 6, wherein the determination unit determines one of the first, second, and third configurations of the partitions based on partition configuration information received from a firmware, the partition configuration information identifying a configuration of the partition for the data transfer apparatus, and the setting unit sets the transfer rate for broadcasting data.

8. The data transfer apparatus according to claim 6, wherein the setting unit sets the transfer rate for broadcasting data when the one or plurality of processing apparatuses included in a partition are in a power-off condition.

9. The data transfer apparatus according to claim 6, wherein the setting unit sets the transfer rate for broadcasting data when a hardware resource is added to or deleted.

10. The data transfer apparatus according to claim 6, wherein the setting unit sets the transfer rate for broadcasting data when there is a suspend condition.

11. The data transfer apparatus according to claim 6, wherein the data transfer apparatus further includes a time difference adjustment control unit that adjusts a predetermined delay time of transferring data output from a processor included in a processing apparatus based on the transfer rate set by the setting unit.

12. The data transfer apparatus according to claim 11, wherein
the time difference adjustment control unit includes a buffer and a selector connecting to an output of the buffer, and
the selector outputs transferring data via the output of the buffer from a processor included in a processing apparatus or outputs transferring data, bypassing the output of the buffer, from a processor included in a processing apparatus.

13. An apparatus comprising:
a plurality of processing apparatuses each including a processor that outputs data; and
a data transfer apparatus connected to the plurality of processing apparatuses that transfers data output from the processor included in the plurality of processing apparatuses,
wherein the data transfer apparatus comprises:
a determination unit configured to determine one of first, second, and third configurations of partitions through which the apparatus is operated as combination of the plurality of processing apparatuses, the first configuration being a configuration of partitions in which there exists neither connections between the data transfer apparatus and another data transfer apparatus inside same enclosure nor connections between different processing apparatuses, the second configuration being a configuration of partitions in which there exists one or more connections between the data transfer apparatus and another data transfer apparatus inside same enclosure and there exists no connections between different processing apparatuses, the third configuration being a configuration of partitions in which there exists one or more connections between the data transfer apparatus and another data transfer apparatus inside same enclosure and there exists one or more connections between different processing apparatuses, and
a setting unit configured to set a transfer rate for broadcasting data in the data transfer apparatus included in a partition, based on the determined one of the first, second, and third configurations of the partitions, according to:
a first rate when the first configuration is determined as a configuration of the partition for the data transfer apparatus,
a second rate slower than the first rate when the second configuration is determined as a configuration of the partition for the data transfer apparatus, and
a third rate slower than the second rate when the third configuration is determined as a configuration of the partition for the data transfer apparatus.

14. The apparatus according to claim 13, wherein the determination unit determines one of the first, second, and third configurations of the partitions based on partition configuration information received from a firmware, the partition configuration information identifying a configuration of the partition for the data transfer apparatus, and the setting unit sets the transfer rate for broadcasting data.

15. The apparatus according to claim 13, wherein the setting unit sets the transfer rate for broadcasting data when the one or plurality of processing apparatuses included in a partition are in a power-off condition.

16. The apparatus according to claim 13, wherein the setting unit sets the transfer rate for broadcasting data when a hardware resource is added to or deleted.

17. The apparatus according to claim 16, wherein the setting unit sets the transfer rate for broadcasting data when the apparatus has a suspend condition.

18. The apparatus according to claim 13, wherein the data transfer apparatus further includes a time difference adjustment control unit that adjusts a predetermined delay time of transferring data output from a processor included in a processing apparatus based on the transfer rate set by the setting unit.

19. The apparatus according to claim 18, wherein
the time difference adjustment control unit includes a buffer and a selector connecting to an output of the buffer, and
the selector outputs transferring data via the output of the buffer from a processor included in a processing apparatus or outputs transferring data, bypassing the output of the buffer, from a processor included in a processing apparatus.

\* \* \* \* \*